(12) United States Patent
Hiller et al.

(10) Patent No.: US 8,537,578 B2
(45) Date of Patent: Sep. 17, 2013

(54) REDUNDANT CONTROL METHOD FOR A POLYPHASE CONVERTER WITH DISTRIBUTED ENERGY STORES

(75) Inventors: Marc Hiller, Lauf an der Pegnitz (DE); Dietmar Krug, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 203 days.

(21) Appl. No.: 13/057,575

(22) PCT Filed: May 14, 2009

(86) PCT No.: PCT/EP2009/055808
§ 371 (c)(1),
(2), (4) Date: Feb. 4, 2011

(87) PCT Pub. No.: WO2010/015430
PCT Pub. Date: Feb. 11, 2010

(65) Prior Publication Data
US 2011/0134666 A1    Jun. 9, 2011

(30) Foreign Application Priority Data
Aug. 7, 2008 (DE) .......................... 10 2008 036 811

(51) Int. Cl.
*H02H 7/122* (2006.01)
(52) U.S. Cl.
USPC .......................................................... 363/55
(58) Field of Classification Search
USPC ................. 363/34, 35, 37–41, 64, 65, 72–79, 363/97, 98, 13, 36, 55, 71, 131, 132
See application file for complete search history.

(56) References Cited

U.S. PATENT DOCUMENTS

| 5,986,909 A | * | 11/1999 | Hammond et al. | ............. 363/65 |
| 6,014,323 A | | 1/2000 | Aiello | |
| 2005/0083716 A1 | * | 4/2005 | Marquardt | ................... 363/132 |
| 2006/0279249 A1 | | 12/2006 | Aiello | |

FOREIGN PATENT DOCUMENTS

| DE | 101 03 031 A1 | 7/2002 |
| DE | 10 2005 045 091 A1 | 3/2007 |
| DE | 10 2005 045 090 B4 | 8/2007 |
| RU | 2 210 166 C1 | 8/2003 |
| RU | 2 295 824 C1 | 3/2007 |
| WO | WO 2007 033852 A2 | 3/2007 |

* cited by examiner

*Primary Examiner* — Adolf Berhane
*Assistant Examiner* — Yemane Mehari
(74) *Attorney, Agent, or Firm* — Henry M. Feiereisen LLC (57) ABSTRACT

An inverter having three phase modules with an upper valve arm and a lower valve arm having each at least three two-pole subsystems connected in series, which each subsystem having a storage capacitor, is controlled in the event of failure of one or more subsystems by setting the terminal voltage of the failed subsystems permanently to zero, setting the terminal voltage of a corresponding number of fault-free subsystems in corresponding fault-free valve branches likewise to zero, and increasing the capacitor voltages of the fault-free subsystems of the failed valve branches such that their sum is equal to the sum of the capacitor voltages of the subsystems of a corresponding fault-free valve branch, while leaving the control of the fault-free phase modules unchanged. In this way, a symmetrical voltage system with maximum amplitude is obtained at the inverter outputs.

7 Claims, 7 Drawing Sheets

REDUNDANT CONTROL METHOD FOR A POLYPHASE CONVERTER WITH DISTRIBUTED ENERGY STORES

CROSS-REFERENCES TO RELATED APPLICATIONS

This application is the U.S. National Stage of International Application No. PCT/EP2009/055808, filed May 14, 2009, which designated the United States and has been published as International Publication No. WO 2010/015430 and which claims the priority of German Patent Application, Serial No. 10 2008 036 811.3, filed Aug. 7, 2008, pursuant to 35 U.S.C. 119(a)-(d).

BACKGROUND OF THE INVENTION

The invention relates to a method for controlling a converter with distributed energy stores.

DE 101 03 031 A1 discloses a converter with distributed energy stores. An equivalent circuit of a converter such as this is shown in more detail in FIG. 1. According to this equivalent circuit, this known converter, which is annotated 102, has three phase modules, which are each annotated 100. These phase modules 100 are each electrically conductively connected on the DC voltage side to a positive and a negative DC voltage busbar $P_0$ and $N_0$. In the case of a voltage intermediate-circuit converter, a series circuit of two capacitors C1 and C2, across which a DC voltage $U_d$ is dropped, would be connected between these two DC voltage busbars $P_0$ and $N_0$. A connection point between these two capacitors C1 and C2, which are electrically connected in series, forms a virtual neutral point O. Each phase module 100 which forms a bridge arm of the polyphase converter has an upper and a lower bridge arm element, which are referred to in the following text as the respective valve arms T1, T3 and T5 as well as T2, T4 and T6, since the bridge arm elements each represent a converter valve of the polyphase converter with distributed energy stores. Each of these valve arms T1 to T6 has a number of two-pole subsystems 10 which are electrically connected in series. In this equivalent circuit of the converter 102, each valve arm T1, . . . , T6 has four two-pole submodules 10. The number of subsystems 10 per valve arm T1, . . . , T6 is, however, not restricted to this illustrated number. Each junction point between two valve arms T1 and T2; T3 and T4 as well as T5 and T6 of a phase module 100 forms a respective connection L1, L2 and L3 on the AC voltage side of a phase module 100. Since, in this illustration, the converter 102 has three phase modules 100, a three-phase load, for example a polyphase motor, can be connected to their connections L1, L2 and L3 on the AC voltage side, which are also referred to as load connections.

Figure 2:
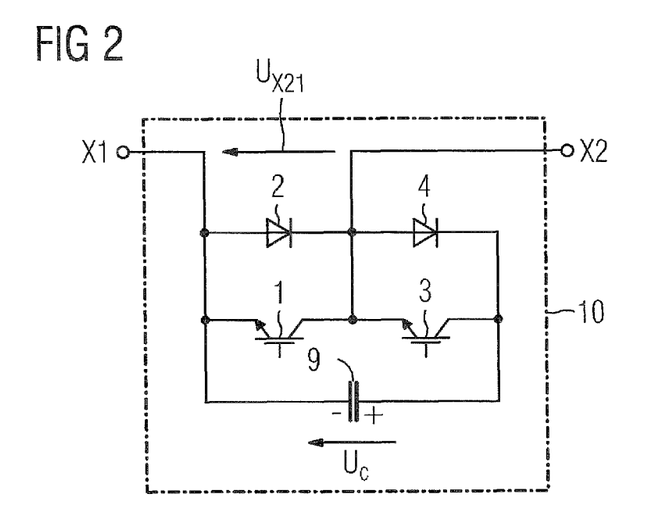
FIG. 2 shows an equivalent circuit of a first embodiment of a known two-pole subsystem in the converter shown in FIG. 1.
Figure 3:
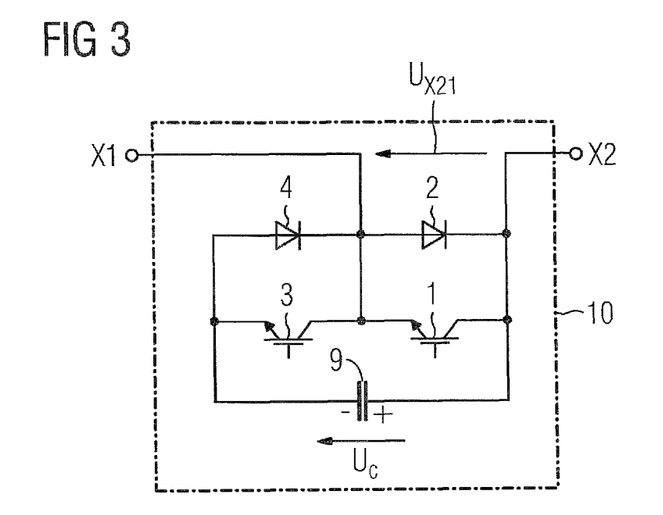
FIG. 3 shows an equivalent circuit of a second embodiment of a known two-pole subsystem in the converter as shown in FIG. 1, FIGS. 4 to 6 show potential profiles of a phase module of a converter as shown in FIG. 1 when no faults are present, in each case in the form of a graph plotted against the time t.

FIG. 2 shows an equivalent circuit of one known embodiment of a two-pole subsystem 10 in more detail. The circuit arrangement shown in FIG. 3 represents a functionally completely equivalent variant. Both embodiments of a two-pole subsystem 10 are known from DE 101 03 031 A1. These known two-pole subsystems 10 each have two semiconductor switches 1 and 3 which can be turned off, in each case two diodes 2 and 4 and in each case one unipolar energy storage capacitor 9. The two semiconductor switches 1 and 3 which can be turned off are electrically connected in series, with this series circuit being connected electrically in parallel with the energy storage capacitor 9. One of the two diodes 2 and 4 is electrically connected in parallel with each semiconductor switch 1 and 3 which can be turned off such that these diodes 2 and 4 are connected back-to-back in parallel with the corresponding semiconductor switch 1 or 3 which can be turned off. The unipolar energy storage capacitor 9 in the subsystem 10 consists either of a capacitor or of a capacitor bank having a plurality of such capacitors. The connection point between the emitter of the semiconductor switch 1 which can be turned off and the anode of the diode 2 forms a connecting terminal X1 of the subsystem 10. The connection point between the two semiconductor switches 1 and 3 which can be turned off and the two diodes 2 and 4 forms a second connecting terminal X2 of the subsystem 10.

In the embodiment of the two-pole subsystem 10 shown in FIG. 3, this connection point forms the first connecting terminal X1. The connection point between the collector of the semiconductor switch 1 which can be turned off and the cathode of the diode 2 forms the second connecting terminal X2 of the subsystem 10.

In both embodiments of the two-pole subsystem 10 shown in FIGS. 2 and 3, Insulated Gate Bipolar Transistors (IGBT) are used as the semiconductor switches 1 and 3 which can be turned off. It is likewise possible to use MOS Field-Effect Transistors, also referred to as MOSFETs. It is also possible to use Gate Turn Off Thyristors, also referred as GTO thyristors, or Integrated Gate Commutated Thyristors (IGCT).

Figure 1:
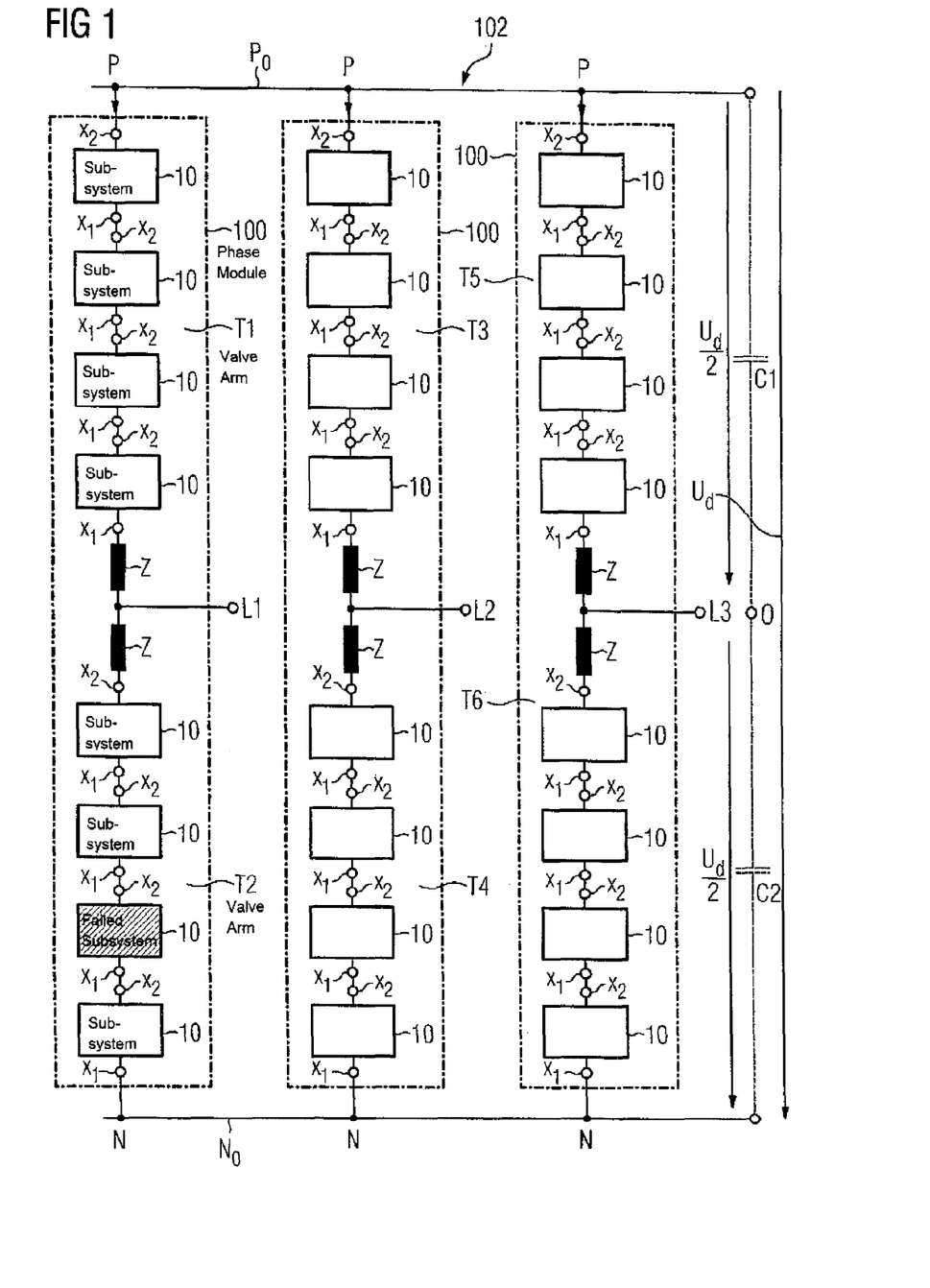
FIG. 1 shows an equivalent circuit of a known converter with distributed energy stores.

According to DE 101 03 031 A1, the two-pole subsystems 10 in each phase module 100 of the converter 102 as shown in FIG. 1 are switched to a switching state I, II and III. In the switching state I, the semiconductor switch 1 which can be turned off is switched on, and the semiconductor switch 3 which can be turned off is switched off. The terminal voltage $U_{X21}$ which is present at the connecting terminals X1 and X2 in the two-pole subsystem 10 is therefore equal to zero. In the switching state II, the semiconductor switch 1 which can be turned off is switched off, and the semiconductor switch 3 which can be turned off is switched on. In this switching state II, the terminal voltage $U_{X21}$ which is present is equal to the capacitor voltage $U_C$ across the energy storage capacitor 9. In the switching state III, both semiconductor switches 1 and 3 which can be turned off are switched off, and the capacitor voltage $U_C$ across the energy storage capacitor 9 is constant.

In order to allow this converter 102 to operate in redundant form with distributed energy stores 9 as shown in FIG. 1, it is necessary to ensure that a faulty subsystem 10 is permanently short-circuited at its terminals X1 and X2. This means that the terminal voltage $U_{X21}$ of the faulty subsystem 10 is zero irrespective of the current direction through the terminals X1 and X2.

The failure of one of the semiconductor switches 1 and 3 which can be turned off and are present in the subsystem 10, or of an associated control circuit, results in this subsystem 10 not operating correctly. Further possible causes of malfunctions are, inter alia, faults in the associated control circuit for the semiconductor switches, their power supply, communication and measured-value detection. That is to say, the two-pole subsystem 10 can no longer be controlled as desired in one of the possible switching states I, II or III. The short-circuiting of the subsystem 10 at its connections X1 and X2 means that no more power is supplied to this subsystem 10. This reliably precludes consequential damage such as overheating and fire resulting from continued operation of the converter 102.

A conductive connection like a short circuit such as this between the connecting terminals X1 and X2 of a faulty two-pole subsystem 10 has to reliably carry at least the operating current of one valve arm T1, . . . , T6 in the phase module 100 in which the faulty two-pole subsystem 10 is connected, without overheating. DE 10 2005 040 543 A1 discloses how a faulty subsystem 10 can be reliably short-circuited in order that this known converter 102 with distributed energy stores 9 can continue to be operated in a redundant form.

Figure 4:
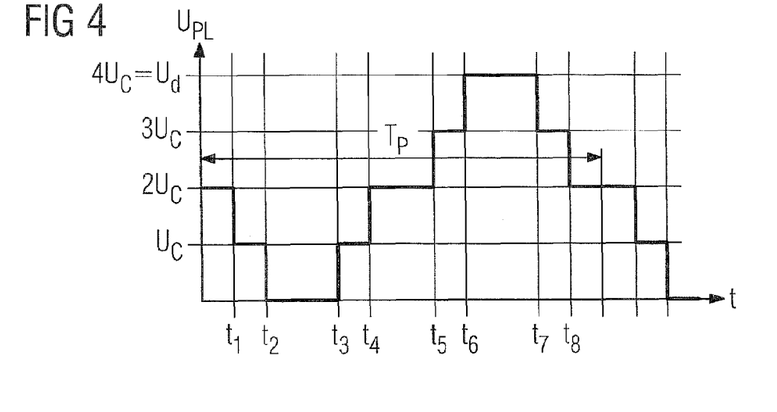
Figure 5:
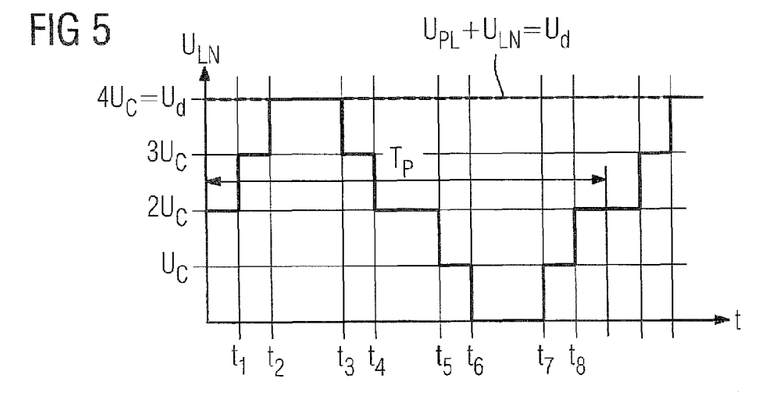

The following explanation is based on the assumption that the energy storage capacitors 9 in all of the two-pole subsystems 10 each have the same voltage $U_C$. Methods for initially producing this state and for maintaining it during operation are likewise known from DE 101 03 031 A1. FIG. 4 shows a graph of a profile of the potential difference $U_{PL}$ between the terminal P of a phase module 100 and a load connection L, plotted against the time t. FIG. 5 shows a graph of a profile of the potential difference $U_{LN}$ between the load connection L and the potential at the terminal N, plotted against the time t. According to these potential profiles $U_{PL}$ and $U_{LN}$, in each case one subsystem 10 of the eight two-pole subsystems 10 of the valve arms T1 and T2 is connected or disconnected at each of the times t1, ..., t8. Switching on in this case corresponds to a change from the switching state I to the switching state II. Turning off corresponds to a change from the switching state II to the switching state I. These two graphs each show one period $T_P$ of a fundamental oscillation of the potential profile $U_{LO}$ (FIG. 6) between the load connection L and the virtual neutral point O of a phase module 100 of the converter 102 with distributed energy stores 9, for the potential profiles $U_{PL}$ and $U_{LN}$.

Figure 6:
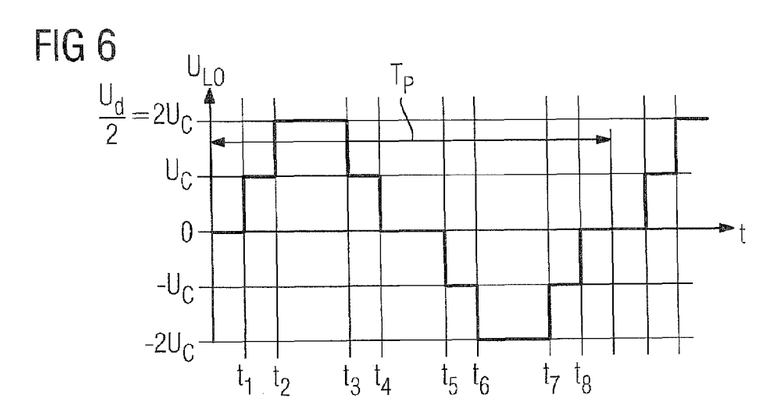

FIG. 6 shows a profile of the difference between the potential profiles $U_{LN}$ and $U_{PL}$ as shown in FIGS. 4 and 5, in the form of a graph plotted against the time t. This resultant potential profile $U_{LO}$ occurs between a connection L1, L2 or L3 on the AC voltage side of a phase module 100 in the converter 102 with distributed energy stores 9 as shown in FIG. 1 and a virtual neutral point O, which is formed by the connection point between the two capacitors C1 and C2 in a voltage intermediate circuit having two capacitors C1 and C2. Corresponding components of harmonics or DC voltage components in each of the output voltages $U_{LXO}$ of the phase modules 100 in the polyphase converter 102 with distributed energy stores 9 as shown in FIG. 1 are cancelled out in the case of a balanced polyphase voltage system in the difference voltages between in each case two phase-shifted output voltages $U_{L10}$, $U_{L20}$ or $U_{L30}$. These two potential profiles $U_{PL}$ and $U_{LN}$ likewise show that the sum of the potentials at any time is $4 \cdot U_C$. This means that the value of the DC voltage $U_d$ between the DC voltage busbars $P_0$ and $N_0$ always corresponds to a constant number of subsystems 10 in the switching state II multiplied by the value of the capacitor voltage $U_C$ across the capacitor 9. In the situation illustrated by way of example, this number corresponds to the number of two-pole subsystems 10 in the valve arms T1, ..., T6 in the converter 102 as shown in FIG. 1.

Figure 7:
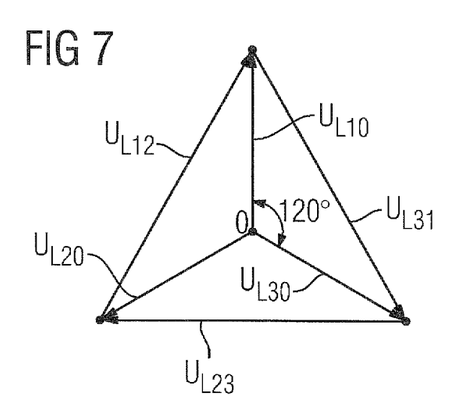
FIG. 7 shows a vector diagram of a balanced three-phase voltage system in the converter as shown in FIG. 1 when no faults are present.

FIG. 7 shows the output voltages $U_{L10}$, $U_{L20}$ and $U_{L30}$ of the converter 102 with distributed energy stores 9 and the associated line voltages $U_{L12}$, $L_{L23}$ and $U_{L31}$ together. In this sound situation, the output voltages $U_{L10}$, $L_{L20}$ and $U_{L30}$ and their line voltages $U_{L12}$, $U_{L23}$ and $U_{L31}$ form a balanced polyphase system. This means that the phase shift between the output voltages $U_{L10}$, $L_{L20}$ and $U_{L30}$ and their line voltages $U_{L12}$, $U_{L23}$ and $U_{L31}$ in the three phase modules 100 in the converter 102 with distributed energy stores 9 with respect to one another is 120° electrical.

DE 10 2005 045 091 A1 discloses a method for controlling a converter with distributed energy stores as shown in FIG. 1, by means of which the balance conditions are maintained in the event of a malfunction of at least one subsystem in a phase module of this converter. According to this known method, one valve arm of one of the three phases in which one or more of the two-pole subsystems is or are faulty is first of all determined. Each faulty subsystem is controlled such that the terminal voltage is in each case zero. A number of subsystems corresponding to the number of determined two-pole subsystems in a further valve arm of the faulty phase module are controlled such that the terminal voltage in each case equal to a capacitor voltage. This control of the subsystems in the faulty phase module is likewise carried out in subsystems in the valve arms of the sound phase modules.

Figure 8:
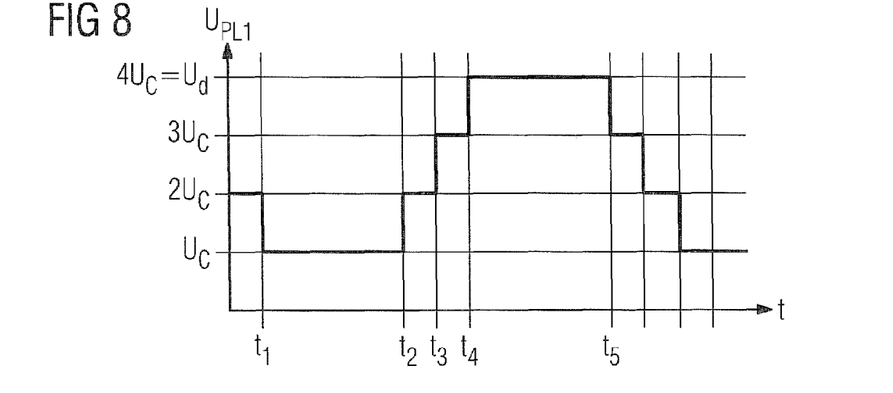
FIGS. 8 to 10 show potential profiles of a phase module in a converter as shown in FIG. 1 when a fault is present, in each case in the form of a graph plotted against the time t.
Figure 9:
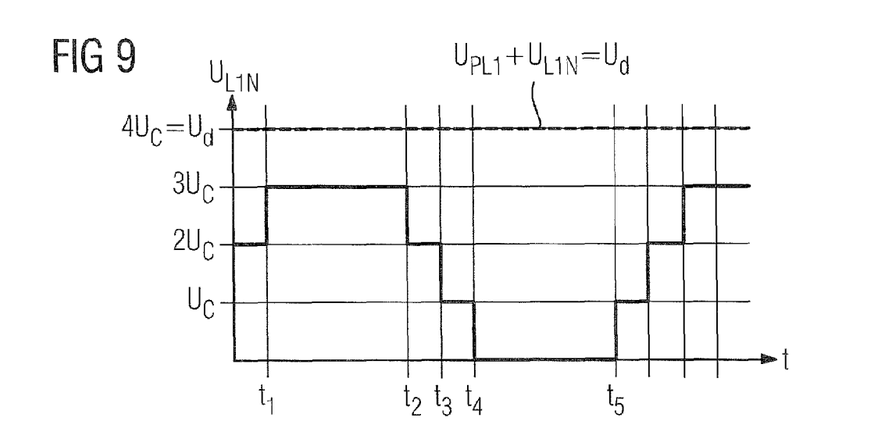

FIG. 8 shows a graph of a profile of the potential difference $U_{PL1}$ between the terminal P in a phase module 100 and a load connection L1, plotted against the time t, with one faulty two-pole subsystem 10 in the lower valve arm T2. FIG. 9 shows a graph of a profile of the potential difference $U_{L1N}$ between the terminal L1 and the potential of the terminal N, plotted against the time t. As can be seen from the profile of the potential difference $U_{PL1}$ in FIG. 8, a subsystem 10 in the upper valve arm T1 of the phase module 100 is controlled such that its terminal voltage $U_{X21}$ is always equal to the capacitor voltage $U_C$ across the energy storage capacitor 9. Of the four subsystems 10 illustrated by way of example in the upper valve arm T1, there are now only three remaining subsystems 10 which can be connected and disconnected. As can be seen from the time profile of the potential difference $U_{L1N}$ of the lower valve arm T2 in the phase module 100, one of the four subsystems 10 illustrated by way of example is controlled such that its terminal voltages $U_{X21}$ are always equal to zero. As shown in FIG. 1, of these lower valve arms T2, T4 and T6 in the three phase modules 100, the valve arm T2 has a faulty two-pole subsystem 10, identified by shading. The value of the amplitude of the voltage $U_{L1N}$ of the valve arm T2 can therefore now be only at most $3 \cdot U_C$. This known method results in the number of subsystems 10 used in the event of a fault being equal to the number of subsystems 10 used when no faults are present. The profile of the amplitude of the sum of the potential differences $U_{PL1}$ and $U_{L1N}$ is shown by means of a dashed line in the graph in FIG. 9. In comparison to the situation when there are no faults, the voltages $U_{L10}$, $U_{L20}$ and $U_{L30}$ each have a lower maximum amplitude when a fault is present. In the illustrated example, these voltages $U_{L10}$, $U_{L20}$ and $U_{L30}$ when no fault is present have a maximum voltage amplitude of $\frac{1}{2} \cdot U_d$ each, while in contrast the maximum amplitude when a fault is present is only $\frac{3}{8} \cdot U_d$. This means that this known method results in a balanced three-phase voltage system, with a lower maximum amplitude, when a fault is present.

Figure 10:
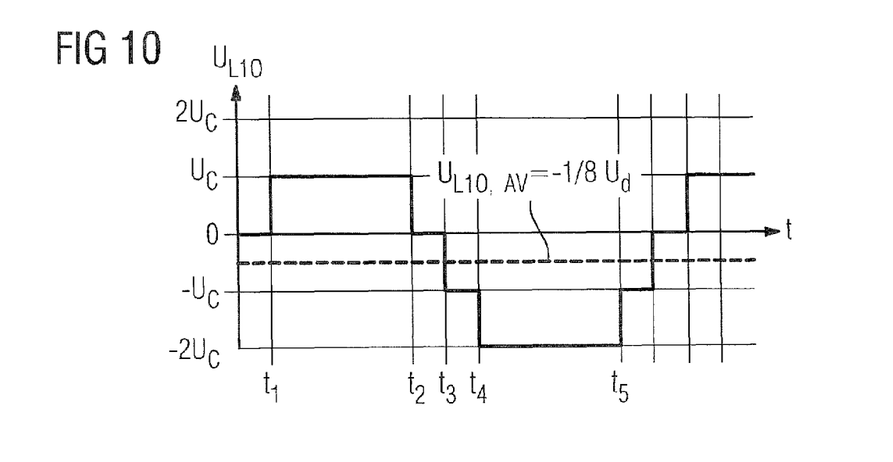

FIG. 10 shows a profile of the difference in the voltage differences $U_{PL1}$ and $U_{L1N}$ as shown in FIGS. 8 and 9, plotted against the time t. As can be seen from this time profile of the potential $U_{L10}$ between the load connection L1 and a virtual neutral point O, this potential no longer oscillates symmetrically about a null position. This null position is shifted through $\frac{1}{8} \cdot U_d$. This means that this potential profile has a DC voltage component.

Figure 11:
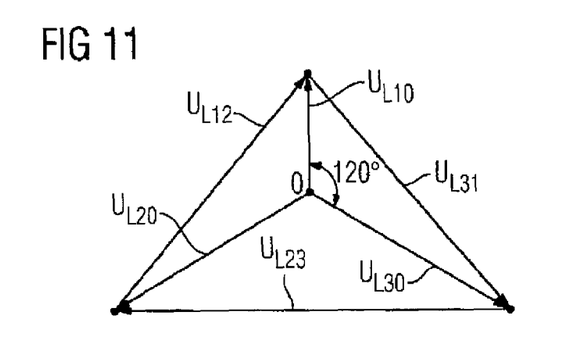
FIG. 11 shows a vector diagram of an unbalanced three-phase voltage system in the converter as shown in FIG. 1, when a fault is present.

FIG. 11 shows a vector diagram of a three-phase voltage system in the converter 102 as shown in FIG. 1 when one subsystem 10 is faulty. As can be seen from this voltage system, the amplitudes of the output voltages $U_{L20}$ and $U_{L30}$ have not changed in comparison to the voltage system shown in FIG. 7. Since one subsystem 10 (shaded) has failed in the valve arm T2 the amplitude of the output voltage $U_{L10}$ of this faulty phase module 100 has been reduced in magnitude by the magnitude of a capacitor voltage $U_C$. The magnitudes of the line voltages $U_{L12}$, $U_{L23}$ and $U_{L31}$ are therefore no longer the same. The amplitudes of the two line voltages $U_{L12}$ and $U_{L31}$ are the same, but are less than the line voltage $U_{L23}$. The failure of at least one subsystem 10 in a valve arm T1, ..., T6 results in an unbalanced voltage system from a balanced voltage system of line voltages $U_{L12}$, $U_{L23}$, $U_{L31}$. The unbalance which occurs depends on the number of subsystems 10 which have failed and on the number of valve arms T1, ..., T6 which are affected.

SUMMARY OF THE INVENTION

The invention is now based on the object of specifying a method for controlling a three-phase converter with distributed energy stores, by means of which a balanced three-phase voltage system can be generated when at least one energy store fails.

In accordance with the method according to the invention, the number of failed subsystems and therefore the faulty valve arms in the phase modules of the converter with distributed energy stores are determined first of all. The faulty subsystems and the subsystems of sound valve arms in faulty phase modules are then controlled such that their terminal voltages are equal to zero. In consequence, all the faulty subsystems and subsystems in the sound valve arms of faulty phase modules are short-circuited, corresponding to the number of faulty subsystems. The output voltage of a faulty phase module therefore has a reduced amplitude which is symmetrical with respect to a null position. This means that this output voltage has no DC voltage component. An unbalanced voltage system is formed from a balanced three-phase voltage system, which is present at the output terminals of the converter with distributed energy stores, as a result of the failure of at least one subsystem in one valve arm of one phase module.

The fundamental idea on which this invention is based is that the output voltage from a faulty phase module which has been reduced because of the failure of at least one subsystem must be raised to its previous amplitude value again. In doing so, the unbalanced voltage system will become balanced again, and the amplitudes of this balanced voltage system would at the same time be a maximum.

This raises the question as to how an amplitude which is intended to correspond to the amplitude of an output voltage of a phase module during operation without any faults can be generated with a reduced number of subsystems. The solution is to charge the energy stores in the remaining subsystems in the valve arms of a faulty phase module to a higher extent such that the sum of the increased capacitor voltages in the subsystems in a valve arm of a faulty phase module is equal to the sum of the capacitor voltages in the subsystems in a valve arm of a sound phase module. The greater the number of subsystems that there are in each valve arm, the less is the increase in each capacitor voltage in the remaining subsystems in a valve arm of a faulty phase module if one subsystem fails.

In one advantageous method, the remaining subsystems in a faulty phase module are electrically conductively connected for a predetermined time interval successively to an energy source which provides at least the increased capacitor voltage. During this time interval, a current flows out of the energy source into the connected subsystem, thus recharging its energy store. When a capacitor voltage which is present in the energy store reaches a predetermined value, then this subsystem is disconnected from the energy source which is linked to a next subsystem in a faulty phase module. Since a voltage source such as this is already provided in a converter such as this for precharging of the energy stores in the subsystems in the converter, there is no need to add any hardware to an existing converter.

In a further advantageous method, an additional valve arm current is set which flows successively for a predetermined time interval through the remaining subsystems in a faulty phase module. This also increases the capacitor voltages of the remaining subsystems in a faulty phase module.

The method for generation of additional valve arm currents by means of additional voltage/time integrals is known from DE 10 2005 045 090 B4.

The method according to the invention is therefore subdivided into three sections, specifically the determination of failed subsystems and their short circuits, wherein subsystems are also short-circuited corresponding to the number of failed subsystems in a valve arm of a valve arm, which corresponds to the faulty valve arm, in a faulty phase module. The output voltage of the faulty phase module is therefore reduced corresponding to the number of failed subsystems, but has no DC voltage component. In the second section, the capacitor voltages of the remaining subsystems in a faulty phase module are increased such that the sum of these capacitor voltages is equal to the sum of the capacitor voltages of a sound phase module. A third section of the method according to the invention deals with the control of the subsystems in the sound phase modules. This control does not differ from the control of the subsystems in the converter with distributed energy stores during operation when no faults are present.

BRIEF DESCRIPTION OF THE DRAWING

In order to explain the invention further, reference is made to the drawing, which schematically illustrates one embodiment of a method according to the invention for controlling a three-phase converter with distributed energy stores.

DETAILED DESCRIPTION OF PREFERRED EMBODIMENTS

Figure 12:
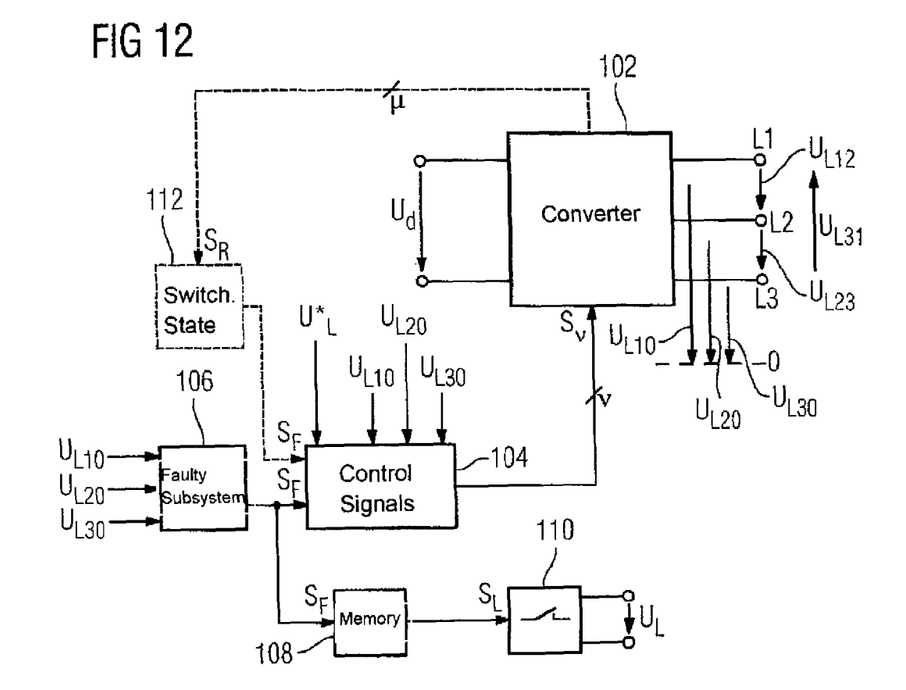
FIG. 12 shows a block diagram of a control system according to the invention for a converter as shown in FIG. 1, and FIGS. 13 to 15 show voltage profiles of a faulty phase module in the converter as shown in FIG. 1, in each case in the form of a graph plotted against the time t, generated by means of the method according to the invention.

FIG. 12 shows a block diagram of a control system for a converter 102 with distributed energy stores 9 as shown in FIG. 1. In this block diagram, 104 denotes a device for production of control signals $S_v$, 106 denotes a device for determination of faulty subsystems 10, 108 denotes a memory apparatus and 110 denotes a low-voltage energy source which can be connected. On the output side, the device 104 is electrically conductively connected to control connections of the semiconductor switches 1 and 3 in the two-pole subsystems 10 in the valve arms T1 to T6 in the converter 102. The output voltages $U_{L10}$, $U_{L20}$ and $U_{L30}$ which are present at the connections L1, L2 and L3 on the AC voltage side, also referred to as the output terminals of the converter 102, are supplied to the device 106 for determination of faulty two-pole subsystems 10. On the output side, this device 106 is linked on the one hand to an input of the device 104 for production of control signals $S_v$, and on the other hand to an input of the memory unit 108. On the output side, this memory apparatus 108 is connected to an energy source 110 which can be connected. The device 104 for production of control signals $S_v$ is supplied with the determined output voltages $U_{L10}$, $U_{L20}$ and $U_{L30}$, and with a nominal voltage $U^*_L$.

There is a further option for determination of faulty subsystems 10 in the valve arms T1, T2; T3, T4 and T5, T6 in each phase module 100 of the converter 102 with distributed energy stores 9. This is done using a device 112 which is linked on the input side to each two-pole subsystem 10 in the converter 102. Each subsystem 10 sends a feedback signal $S_R$ to this device 112 which indicates whether the associated subsystem 10 has or has not changed its switching state correctly. These $\mu=6$ m feedback signals $S_R$ are used to generate a fault signal $S_F$, which is supplied to the device 104. Since this represents a further option for determination of faulty two-pole subsystems 10, this is illustrated in the control system shown in FIG. 12 by means of a dashed line.

As already mentioned, an output voltage $U_{L10}$, $U_{L20}$ or $U_{L30}$ of the converter 102 with distributed energy stores 9 as shown in FIG. 1 decreases as soon as one two-pole subsystem 10 fails in a valve arm T1, ..., T6 in one of the three phase modules 100 in the converter 102. The value of the amplitude reduction in this case corresponds to the value of a capacitor voltage $U_C$ across the energy store 9.

It is now assumed that one two-pole subsystem 10 in the valve arm T2 of the phase module 100 in the converter 102 with distributed energy stores 9 as shown in FIG. 1 has been safely short-circuited because of some fault. This faulty subsystem 10 is indicated by means of shading in the equivalent circuit of the converter 102 shown in FIG. 1.

In accordance with the method according to the invention, the number of faulty subsystems 10 is first of all determined. Since it is assumed that only one subsystem 10 is faulty, a number "1" is determined. Furthermore, that valve arm T1, ..., T6 in which the faulty system 10 is arranged is determined. In the assumed case, this is the valve arm T2. The faulty subsystem 10 in the valve arm T2 and a subsystem 10 in the sound valve arm T1, which corresponds to the faulty valve arm T2, in the faulty phase module 100 are controlled such that their terminal voltages $U_{x21}$ are each zero. If a plurality of subsystems 10 in one valve arm T1 ..., T6 or in a plurality of valve arms T1, ..., T6 are faulty, then control action is taken corresponding to the number of faulty subsystems 10 in the valve arms T1, ..., T6 of faulty phase modules 100 which correspond to the faulty valve arms T1, ..., T6, such that the terminal voltages $U_{x21}$ of these subsystems 10 are also each zero. This means that 2n subsystems 10, where n=the number of faulty subsystems 10, are short-circuited.

With the number of faulty subsystems 10 and knowledge of the faulty valve arms, it is possible to determine the voltage dip in each case at an output L1, I2 or L3 of the phase modules in the converter 102 with distributed energy stores 9. The number of subsystems 10 used per valve arm T1, ..., T6 and the capacitor voltage $U_C$ which is in each case present across the energy storage capacitor 9 in each subsystem 10 is known, as a result of which the amplitude of each voltage $U_{L10}$, $U_{L20}$ and $U_{L30}$ which is present at the output terminals L1, L2 and L3 is known. This amplitude is equal to $mU_C/2$, where m is the number of subsystems 10 used per valve arm T1, ..., T6. The greater the number m of subsystems 10 used, the less is the amplitude dip in the event of failure of one subsystem 10 in a valve arm T1, ..., T6.

The aim of the invention is now to compensate for this voltage dip in a faulty phase module 100 by increasing the capacitor voltages $U_C$ of the subsystems 10 in the faulty phase module 100. For this purpose, the energy stores 9 in these subsystems 10 are charged further such that the sum of the increased capacitor voltages $U^*_C$ is equal to the sum of the capacitor voltages $U_C$ in a valve arm T3, T4 or T5, T6 in a sound phase module 100. This increased capacitor voltage $U^*_C$ is given by:

$$U^*_C = U_C + \Delta U \text{ where } \Delta U = U_C/m{-}n.$$

In the assumed case, this means that:

$$\Sigma U^*_C = 4/3 U_C$$

This means that the capacitor voltages $U_C$ in the energy stores 9 in the three subsystems 10 which are still present in the two valve arms T1 and T2 of the faulty phase module 100 must be increased by one third of their value. If eight subsystems 10 are used instead of four subsystems 10 per valve arm T1, ..., T6, then the capacitor voltages $U^*_C$ in the subsystems 10 of each valve arm T1 and T2 in a faulty phase module 100 must need each be increased only by ⅐ of their value according to the cited equation for an increase to the capacitor voltage $U^*_C$.

With the increase in the capacitor voltage $U_C$ to the value $U^*_C$ across the energy store 9 in each subsystem 10 in a faulty phase module 100, the voltage load on the two semiconductor switches 1 and 3 and the two diodes 2 and 4 likewise in each case rises. In order to ensure that these semiconductors 1 to 4 in each subsystem 10 in a faulty phase module 100 withstand this voltage load, the number m of subsystems 10 used in each valve arm T1, ..., T6 in the converter 102 with distributed energy stores 9 should be as high as possible, for example eight, in particular, twelve. The greater the number m of subsystems 10 used in each valve T1 ..., T6 of the converter 102 with distributed energy stores 9 is, the less is the increase in the capacitor voltage $U_C$ in the remaining subsystems 10 in a faulty phase module 100, and the greater the number of faulty subsystems 10 in a valve arm T1, ..., T6 in a phase module 100 which can be compensated for by increasing the capacitor voltages $U_C$ in the remaining subsystems 10 in the two valve arms T1, T2; T3, T4 or T5, T6 in a faulty phase module 100.

The amount $\Delta U$ by which the capacitor voltages $U_C$ of the subsystems 10 in the valve arms T1 and T2 in the faulty phase module 100 must in each case be increased is called up from the memory apparatus 108, as a function of the determined number of faulty subsystems 10 which are found. A signal $S_L$ is produced at the output of this memory apparatus 108, by means of which the energy source 110 which can be connected is connected to the terminals X1 and X2 of the subsystems 10 in the faulty phase module 100 such that their capacitor voltages $U_C$ are increased by a predetermined amount $\Delta U$. In order to achieve this, each sound subsystem 10 which is still present in the two valve arms T1 and T2 in the faulty phase module 100 can be controlled for the charging purposes, as follows: of the (2m−2n) subsystems which are still present (m=the number of subsystems 10 per valve arm; n=the number of faulty subsystems per valve arm) in the converter 102, (2m−2n−1) subsystems 10 are switched to the switching state I, and the respectively remaining sound subsystem 10 is switched to the switching state II or III. A next sound subsystem 10 in the faulty phase module 100 is cyclically successively switched to the switching state II, and the previous one is switched back to the switching state I. The energy source 110 which provides the increased capacitor voltage $U^*_C$ is also required for precharging of the energy stores 9 in the subsystems 10 in the converter 102. This means that this energy source 110 is already a component of this converter 102 with distributed energy stores 9. Such precharging is described in DE 101 03 031 A1, which has already been cited in the introduction.

The capacitor voltages $U_C$ of the energy stores 9 in the subsystems 10 in the two valve arms T1 and T2 in the faulty phase module 100 can also be increased with the aid of an additional valve arm current. In order to generate an additional valve arm current, additional voltage/time integrals must be produced in the valve arm voltages of a phase module, according to DE 102005045090 B4. Voltage/time integrals such as these can be applied by no longer carrying out the switching operations of the two valve arms in a phase module synchronously in time, but with a freely variable time interval. This means that the switching operations in an upper valve arm, for example T1, in a phase module 100 are carried out with a lag and/or lead with respect to the switching operations in a lower valve arm T2 in this phase module 100. This modification of the switching operations in the two valve arms T1, 12 in the faulty phase module 100 dynamically adjusts a predetermined additional voltage/time integral. In order to avoid repeating the majority of this patent specification, reference is made to this patent specification for a more detailed explanation of the generation of additional voltage/time integrals.

Figure 13:
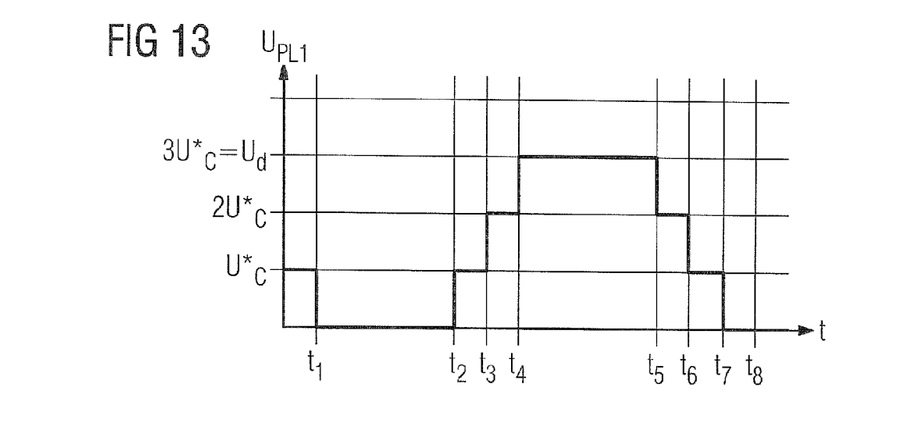
Figure 14:
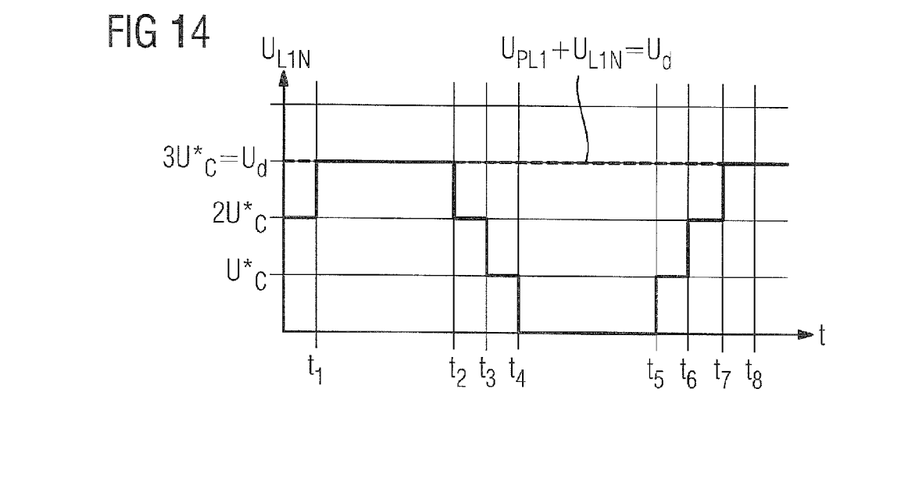
Figure 15:
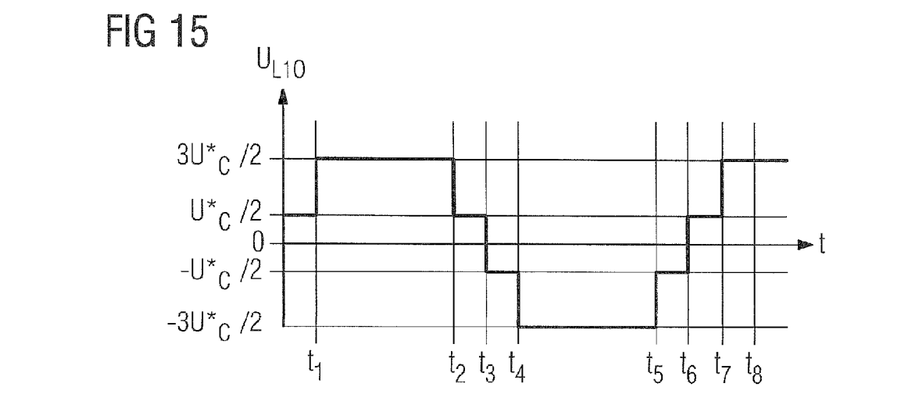

FIGS. 13 and 14 each show potential profiles $U_{PL1}$ and $U_{L1N}$ of the valve arms T1 and T2 in the faulty phase module 100, in each case in the form of a graph plotted against the time t. The profile in the graph shown in FIG. 14 corresponds precisely to the qualitative potential profile in the graph shown in FIG. 9. In accordance with the method according to the invention, a subsystem 10 in the sound valve arm T1, which corresponds to the faulty valve arm T2, in the faulty phase module 100 is likewise controlled such that its terminal voltage $U_{x21}$ is zero. The potential profile $U_{PL1}$ in the graph in FIG. 13 therefore corresponds to the qualitative potential profile $U_{L1N}$ in the graph in FIG. 14, which are in opposite senses to one another. A potential profile $U_{L10}$ which is produced at the output L1 of the faulty phase module 100 in the converter 102 with distributed energy stores 9 is illustrated in FIG. 15 in the form of a graph plotted against the time t. Without the second part of the method according to the invention, specifically the increase in the capacitor voltages $U_C$ by $\Delta U$ in the subsystems 10 which are still present, the peak value L1 output voltage $U_{L10}$ would be $3/2\, U^*_C$ in comparison to $2U_C$ for the output voltage $U_{L20}$ or $U_{L30}$ of a sound phase module 100. This amplitude difference is compensated for by increasing the capacitor voltages $U_C$ by $\Delta U$ in the subsystems 10 which are still present in the two valve arms T1, 12 in the faulty phase module 100. This increase in the capacitor voltages $U_C$ by $\Delta U$ results in the unbalanced vector diagram shown in FIG. 11 being changed back to the balanced vector diagram as shown in FIG. 7.

The method according to the invention even allows redundant further operation of the converter 102 with distributed energy stores 9 in the case of a so-called double fault. A double fault is a fault in which two systems 10 in valve arms which do not correspond in two phase modules 100, for example valve arms T1 and T4, have failed. In order to keep the voltage load on the semiconductors 1 to 4 in each subsystem 10 in the converter 102 with distributed energy stores 9 within limits, the number m of subsystems 10 should be chosen to be as great as possible, in which case m=12 per valve arm T1, . . . . , T6 should be sufficient.

The invention claimed is:

1. A method for controlling an inverter having three phase modules, with each phase module having an upper valve branch and a lower valve branch, and with each valve branch having at least three two-pole subsystems, which each comprise an energy store and are electrically connected in series, with the following method steps in the event of failure of at least one subsystem:
   a) identifying the valve branches in which at least one subsystem has failed,
   b) determining a number of failed subsystems in an identified valve branch,
   c) controlling each failed subsystem such that the terminal voltage of the at least one failed subsystem is permanently zero,
   d) identifying in each fault-free phase module a fault-free valve branch which corresponds to a faulty valve branch in a faulty phase module,
   e) controlling in each identified fault-free valve branch a number of subsystems equal to the number of failed subsystems such that their terminal voltages are permanently zero,
   f) increasing in each failed valve branch a voltage of each energy store in the fault-free subsystems with non-zero permanent terminal voltages such that a sum of the increased voltages of the energy stores in the fault-free subsystems in each failed valve branch is equal to a sum of the voltages of the energy stores of the subsystems in the fault-free valve branch which corresponds to the faulty valve branch in the faulty phase module, and
   g) controlling of the subsystems of the valve branches of the fault-free phase modules commensurate with a control of these subsystems before the failure of the at least one subsystem.

2. The method of claim 1, further comprising the step of successively connecting for a predetermined time interval the subsystems with non-zero permanent terminal voltages of the failed phase modules to a power source which provides at least the increased voltage for each energy store.

3. The method of claim 1, further comprising the step of successively passing for a predetermined time interval a predetermined additional valve branch current through each subsystem with non-zero permanent terminal voltage of the failed phase modules.

4. The method of claim 3, wherein the predetermined additional valve branch current is computed from an additional voltage/time integral of the increased voltages of the energy stores in the fault-free subsystems in each failed valve branch.

5. The method of claim 4, wherein the additional voltage/time integrals are applied such that switching operations in the upper and lower valve branches of each failed phase module are carried out with a predetermined relative time offset.

6. The method of claim 4, wherein the additional voltage/time integrals are applied such as to perform additional switching operations in addition to the synchronized switching operations in the upper and lower valve branches of each failed phase module.

7. The method of claim 1, wherein the energy store is a capacitor and the voltage of the energy store is the voltage of the capacitor.

* * * * *